(12) United States Patent
Kolev

(10) Patent No.: US 7,352,838 B2
(45) Date of Patent: Apr. 1, 2008

(54) REACTOR PRESSURE VESSEL OF A BOILING WATER REACTOR AND METHOD FOR WATER VAPOR SEPARATION IN A REACTOR PRESSURE VESSEL OF A BOILING WATER REACTOR

(75) Inventor: Nikolay Kolev, Herzogenaurach (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/268,862

(22) Filed: Nov. 8, 2005

(65) Prior Publication Data

US 2006/0126778 A1    Jun. 15, 2006

Related U.S. Application Data

(63) Continuation of application No. PCT/EP2004/004926, filed on May 7, 2004.

(30) Foreign Application Priority Data

May 8, 2003    (DE) ............................ 103 20 819

(51) Int. Cl.
    *G21C 15/00* (2006.01)
(52) U.S. Cl. .................. 376/371; 376/370; 376/373; 376/378
(58) Field of Classification Search ........ 376/370–375, 376/377, 378, 379
    See application file for complete search history.

(56) References Cited

U.S. PATENT DOCUMENTS

| | | | | |
|---|---|---|---|---|
| 2,262,860 A | * | 11/1941 | Roe | .............................. 55/349 |
| 2,434,637 A | * | 1/1948 | Brister | .......................... 96/190 |
| 4,912,733 A | * | 3/1990 | Gluntz | ........................ 376/371 |
| 5,075,074 A | * | 12/1991 | Gluntz | ........................ 376/371 |
| 5,106,573 A | | 4/1992 | Fennern | |
| 5,130,082 A | * | 7/1992 | Oosterkamp | ................. 376/371 |
| 5,202,084 A | * | 4/1993 | Fennern et al. | .............. 376/433 |
| 5,321,731 A | * | 6/1994 | Oosterkamp | ................. 376/371 |
| 5,392,326 A | * | 2/1995 | Narabayashi et al. | ........ 376/371 |
| 5,857,006 A | | 1/1999 | Oosterkamp et al. | |
| 5,875,224 A | * | 2/1999 | Smith et al. | ................. 376/439 |
| 5,963,611 A | * | 10/1999 | Narabayashi et al. | ........ 376/371 |
| 2002/0031200 A1 | * | 3/2002 | Metell | .......................... 376/370 |

FOREIGN PATENT DOCUMENTS

| | | |
|---|---|---|
| EP | 0 418 072 A1 | 3/1991 |
| WO | WO 98/24093 | 6/1998 |

* cited by examiner

*Primary Examiner*—Ricardo J. Palabrica
(74) *Attorney, Agent, or Firm*—Laurence A. Greenberg; Werner H. Stemer; Ralph E. Locher

(57) ABSTRACT

A pressure vessel of a reactor has a flow space between the reactor core and a separation device for separating water from water steam. The cross-section area of the flow section of the space expands upstream of the separation device. This makes it possible to pre-separate a water-water steam mixture coming from the reactor core. Due to the pre-separation, only the central area is provided with a cyclone device, and only drying equipment is disposed near the cyclone device. The novel approach makes it possible to reduce the height of the pressure vessel of a reactor.

10 Claims, 1 Drawing Sheet

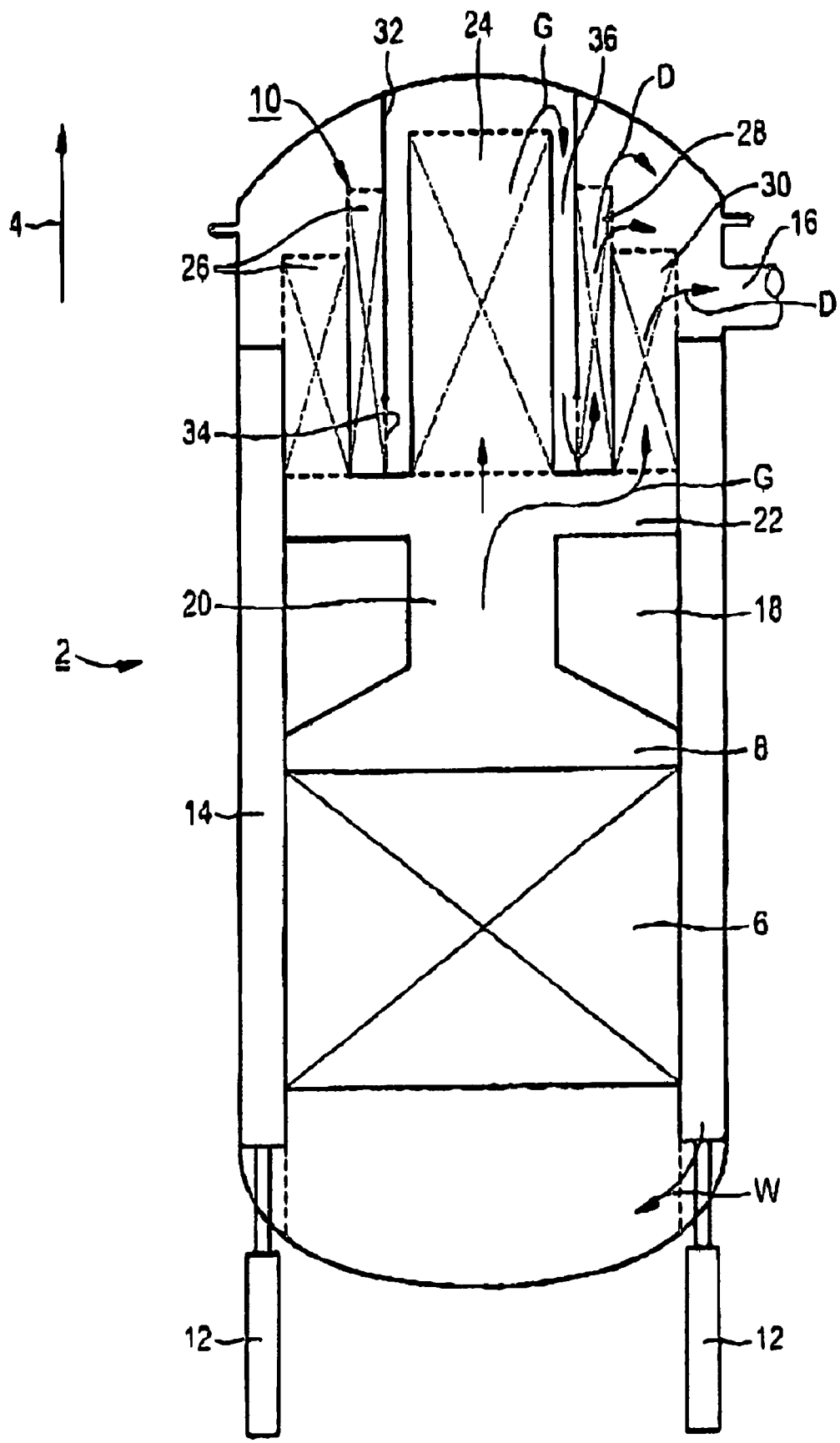

REACTOR PRESSURE VESSEL OF A BOILING WATER REACTOR AND METHOD FOR WATER VAPOR SEPARATION IN A REACTOR PRESSURE VESSEL OF A BOILING WATER REACTOR

BACKGROUND OF THE INVENTION

Field of the Invention

The invention relates to a reactor pressure vessel of a boiling water reactor, in which a separation device for steam/water separation is provided above a reactor core. The invention also relates to a method for steam/water separation in a reactor pressure vessel of this type.

In a boiling water reactor, the cooling water which flows through the reactor core is heated in the reactor pressure vessel. The cooling water is partially converted into the steam phase, so that a mixture of steam and water flows out of the reactor core. Before the steam is fed to a steam turbine for generation of electrical energy, the steam is separated from the water with the aid of the separation device.

WO 99/08287 has disclosed a separation device of this type which has a plurality of separators supported on an upper core grid of the reactor core, so that the steam/water mixture which flows out of the reactor core is introduced directly into the separators. After the separators, as seen in the direction of flow, dryers which have metal baffle or diverter plates are connected downstream of the individual separators. In the separator, the steam/water mixture is set in rotation in the manner of a cyclone, so that the heavy water particles accumulate in the outer region and the low-water steam accumulates in the central region. The low-water steam is then fed to the dryers and when it emerges from the latter has a residual water content of just 0.01% to 0.02% by mass.

On account of the steam/water separation required within the reactor pressure vessel of a boiling water reactor, with the two-stage construction comprising a cyclone or separator device and a drying device connected downstream of it in the direction of flow, overall a very great overall height of the reactor pressure vessel and therefore also of a containment in which the reactor pressure vessel is arranged is required. The large overall height also entails considerable costs, on account of the high safety standards required of the containment and the reactor pressure vessel.

SUMMARY OF THE INVENTION

The invention is based on the object of allowing a reactor pressure vessel to have a low overall height.

According to the invention, the object is achieved by the reactor pressure vessel as claimed in claim 1, in which a flow space with a flow cross-sectional area which increases upstream of the separation device is present between the reactor core and the separation device.

In this configuration, in operation the steam/water mixture flows out of the reactor core into the flow space, which has a predetermined flow cross-sectional area for the steam/water mixture. Before the mixture reaches the separation device, the flow cross-sectional area for the mixture increases in size. The heavy and therefore inert mass parts made up of water remain substantially in the central region, while the lightweight steam parts spread outward. As a result, initial separation already occurs. Therefore, this configuration is based on the idea of utilizing the different inertia of the water and steam fractions for preliminary separation even before entry into the actual separation device.

Since this measure already partially separates the light steam fractions from the heavy water fractions, the subsequent units of the separation device can be correspondingly adapted to the altered conditions, which in particular means that on account of the preliminary separation the separation device can have a low overall height.

To achieve a configuration which is as simple as possible, in an expedient refinement there is a component which initially reduces the flow cross-sectional area and then increases it again. The flow cross-sectional area is substantially defined by the internal cross-sectional area of the reactor pressure vessel. The component initially reduces this maximum flow cross-sectional area in a simple way, so that the mixture is accelerated in a central region. During the subsequent increase in the size of the flow cross-sectional area, which is in particular an abrupt increase to, for example, more than double the previous flow cross-sectional area, the flow velocity is reduced again and the lighter steam fractions flow from the central region into an edge region or outer region.

The component is expediently a ring element with a central passage which defines the flow cross-sectional area and narrows on the entry side. On account of the narrowing, the flow cross-sectional area is initially continuously reduced, thereby preventing undesirable turbulence or pressure losses. After the passage, the flow cross-sectional area increases in size from a minimum value, preferably abruptly, to a maximum value, resulting in particularly efficient preliminary separation. Therefore, it is preferable for the passage to narrow continuously only on the entry side.

Since the preliminary separation in the edge regions means that a low-water mixture is already present, it is provided in a preferred refinement that a separator or cyclone device be arranged only in the central region. At this separator or cyclone device, the separation of the water-rich mixture takes place in the customary way by building up a swirling or rotational flow, so that an encircling liquid ring surrounding a central, low-water steam region is formed in the respective cyclone or separator. The water of the liquid ring remains in the reactor pressure vessel, while the low-water steam region is passed, after a further separation stage, to a steam turbine. The cyclone device may in this case have a plurality of cyclones. The use of the cyclones in only a central subregion reduces costs.

It is preferable for a drying device to be arranged in the annular space surrounding the centrally arranged cyclone device. Since a low-water mixture is already present in the edge regions, on account of the preliminary separation, it is sufficient for just one drying device, which may comprise a plurality of dryers, to be arranged in this edge region. Therefore, there is no need for two-stage separation by upstream cyclone and downstream dryer in this edge region. Rather, the first stage of the separation is achieved by the preliminary separation brought about by the increase in cross-sectional area upstream of the separation device.

With a view to the desired reduction in the overall height of the reactor pressure vessel, it is particularly advantageous if the drying device is arranged exclusively next to the cyclone device and the steam/water mixture which emerges from the cyclone is passed via the drying device arranged at the edge side. In this configuration, therefore, there is no further dryer provided above the cyclone device. The overall height of the reactor pressure vessel is therefore determined, for example, by the upper height of the cyclone device.

With a view to particularly efficient separation, the drying device preferably comprises a first dryer unit for the steam/water mixture emerging from the cyclone device and a second dryer unit for the remaining steam/water mixture, which flows out of the passage into the edge regions. This measure makes it possible to take into account differences in the water content of the mixture by using a different design of the two dryer units, in order to achieve the highest possible separation rate.

In this context, it is expedient for the first dryer unit to be arranged between the cyclone device and the second dryer unit. In this case, the mixture which emerges from the cyclone device is introduced into the first dryer unit in particular via suitable metal diverter plates. After it has left the drying device, the steam, which is then dry, flows to a steam outlet connection piece, to which, in operation, a steam line leading to a turbine is connected.

DESCRIPTION OF THE PREFERRED EMBODIMENTS

An exemplary embodiment of the invention is explained in more detail below with reference to the only drawing, which shows a highly simplified illustration of a reactor pressure vessel of a boiling water reactor.

The reactor pressure vessel 2 extends along a longitudinal direction 4. A reactor core 6 is arranged in the bottom third and is followed by a flow space 8 and then a separation device 10. When the reactor is operating, cooling water W is fed from an outer edge region 14 to the centrally arranged reactor core 6 from below by means of coolant circulation pumps 12, flows through the reactor core 6 and leaves it as a steam/water mixture G. The mixture G flows through the separation device 10 and leaves it as dry steam D in the direction of a steam outlet connection piece 16.

An annular component 18 with a central passage 20 is arranged in the flow space 8. From the reactor core 6, the passage 20 narrows continuously and in particular constantly in the longitudinal direction 4. The annular component 18 is therefore, for example, of conically narrowing design in this region. As a result, the flow cross-sectional area is continuously reduced. The maximum flow cross-sectional area approximately corresponds to the internal cross-sectional area of a core shroud which surrounds the area within the outer edge regions 14. This maximum flow cross-sectional area is reduced to a minimum flow cross-sectional area in the region of the passage 20. After the passage 20, the flow cross-sectional area suddenly widens again to the maximum flow cross-sectional area.

The sudden cross-sectional widening brings about a first phase separation between water and steam; on account of the greater inertia of the heavy water particles, these water particles have less tendency to follow the sudden change in cross section than the light and therefore less inert steam fractions. Before the mixture G enters the separation device 10, therefore, an initial phase separation has already taken place, with a water-rich mixture being present in the central region adjoining the passage 20, and a low-water mixture being present in the edge region 22. This first phase separation on account of the different inertias is utilized by adapting the subsequent components of the separation device 10 to these different conditions. Specifically, a cyclone device 24 is provided only in the central region, and is surrounded by a drying device 26 in the form of a ring. This drying device 26 has a first dryer unit 28 and a second dryer unit 30, which encloses the first dryer unit 28 between it and the cyclone device 24.

On account of the preliminary separation, the mixture G is already sufficiently dry in the edge region 22, which means that a cyclone is no longer required at this location. Sufficient steam drying is achieved here simply by the provision of the drying device 26. Both the drying device 26 and the cyclone device 24 may include a multiplicity of individual dryers or cyclones. The same also applies to the first and second dryer units 28, 30, which may likewise be formed from a plurality of individual dryers. After it has flowed through the second dryer unit 30, the dry steam passes directly to the steam outlet connection piece 16.

On the exit side at the top end of the cyclone device 24, the mixture G which flows through the cyclone device 24 is guided in the opposite direction to the longitudinal direction by a metal guide plate 32 and is fed via an inlet opening 34 to the first dryer device 28. Here, the mixture G is diverted again and flows through the first dryer unit 28 in the longitudinal direction 4, leaving it as dry steam D and then being fed to the steam outlet connection piece 16 together with the steam D emerging from the second dryer unit 30.

The metal guide plate 32 is designed in the form of a hollow cylinder which concentrically surrounds the cyclone device 24, leaving clear a flow path 36. The dryer device 26 and the cyclone device 24 each have their entry sides aligned at the same height. The cyclone device 24 and the second dryer unit 30 each have an inlet for the mixture G oriented toward the flow space 8. The inlet into the first dryer unit 28 is exclusively from the flow path 36 via the inlet opening 34. The flow path 36 and the first dryer unit 28 are closed toward the flow space 8. As an alternative to this closed design, in an alternative configuration (not shown here), the flow path 36 and the first dryer unit 28 are open toward the flow space 8, so that the mixture G which leaves the cyclone device 24 enters the drying device 26 via the flow space 8. Also, the drying device 26 does not necessarily have to be divided into different dryer units. However, this division does have the advantage that the different dryer units 28, 30 are set to different water contents of the mixtures G flowing through them by virtue of suitable design measures, for example different heights. This ensures a high separation rate. Since the mixture in the edge region 22 close to the outer edge region 14 is driest, on account of the preliminary separation in the flow space 8, it is also possible to further differentiate the drying device 26, for example by providing a third dryer unit, which is provided at the outer edge for the mixture G which is already substantially dry.

The in particular sudden cross-sectional widening in the flow space 8 makes advantageous use of the different inertia properties of water and steam to effect an initial phase separation, by virtue of the fact that the subsequent components are matched to the preliminary separation. It is in this context crucial that the cyclone device 24 is now only required in the central region. As a result, a space is left clear in the annular space around the cyclone device 24 and is used to fit the drying device 26, specifically in such a way that the drying device 26 is arranged exclusively in this annular space next to the cyclone device 24. This therefore obviates the hitherto customary arrangement of the drying device 26 on top of the cyclone device, as seen in the longitudinal direction 4, so that overall a reduction in the height of the reactor pressure vessel is achieved.

| List of designations | |
|---|---|
| 2 | Reactor pressure vessel |
| 4 | Longitudinal direction |
| 6 | Reactor core |
| 8 | Build-up space |
| 10 | Separation device |
| 12 | Coolant circulation pump |
| 14 | Outer edge region |
| 16 | Steam outlet connection piece |
| 18 | Component |
| 20 | Passage |
| 22 | Edge region |
| 24 | Cyclone device |
| 26 | Drying device |
| 28 | First dryer unit |
| 30 | Second dryer unit |
| 32 | Metal guide plate |
| 34 | Inlet opening |
| 36 | Flow path |
| D | Steam |
| G | Mixture |
| W | Cooling water |

I claim:

1. A reactor configuration, comprising:
a reactor core of a boiling water reactor;
a separation device for steam/water separation disposed above said reactor core of the boiling water reactor;
a flow space formed between the reactor core and said separation device;
an internal cross-sectional area; and
a flow component disposed in said flow space, said flow component having a central passage defining a flow cross-sectional area, said flow component having an entry side narrowing in a flow direction for initially reducing said flow cross-sectional area and an exit side expanding in said flow direction for increasing said flow cross-sectional area ahead of said separation device;
said flow cross-sectional area, directly after said flow component with respect to the flow direction, being substantially defined by said internal cross-sectional area; and
said separation device including a cyclone device disposed substantially only in a central region of said flow cross-sectional area.

2. The configuration according to claim 1, wherein the narrowing of said entry side is continuous and the expanding of said exit side is abrupt.

3. The configuration according to claim 2, wherein said flow component is a ring element.

4. The configuration according to claim 1, wherein said separation device includes a drying device disposed near said cyclone device.

5. The configuration according to claim 4, further comprising:
a steam outlet connection;
said cyclone device having an exit side;
said drying device formed to exclusively provide a flow path from said exit side of said cyclone device to said steam outlet connection.

6. The configuration according to claim 5, wherein said drying device has a first dryer unit acting on a steam/water mixture emerging from said cyclone device and a second dryer unit acting on a remainder of the steam/water mixture.

7. The configuration according to claim 6, wherein said first dryer unit is disposed between said cyclone device and said second dryer unit.

8. The configuration according to claim 4, wherein said drying device has a first dryer unit acting on a steam/water mixture emerging from said cyclone device and a second dryer unit acting on a remainder of the steam/water mixture.

9. The configuration according to claim 8, wherein said first dryer unit is disposed between said cyclone device and said second dryer unit.

10. The configuration according to claim 1, wherein said separation device includes a drying device disposed in an annular space surrounding said cyclone device.

* * * * *